(12) United States Patent
Wang et al.

(10) Patent No.: US 10,475,322 B1
(45) Date of Patent: Nov. 12, 2019

(54) EARTHQUAKE ALARM DEVICE

(71) Applicant: ZHEJIANG TAI-G PHOTOELECTRIC TECHNOLOGY CO., LTD., Tongxiang, Zhejiang (CN)

(72) Inventors: Jinhua Wang, Chizhou (CN); Ning Shen, Hangzhou (CN)

(73) Assignee: ZHEJIANG TAI-G PHOTOELECTRIC TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/107,730

(22) Filed: Aug. 21, 2018

(51) Int. Cl.
*G08B 21/10* (2006.01)
*G01V 1/00* (2006.01)

(52) U.S. Cl.
CPC .............. *G08B 21/10* (2013.01); *G01V 1/008* (2013.01)

(58) Field of Classification Search
CPC ................................ G08B 21/10; G01V 1/008
USPC ......................................................... 340/501
See application file for complete search history.

(56) References Cited

U.S. PATENT DOCUMENTS

| | | | | |
|---|---|---|---|---|
| 5,929,767 A | * | 7/1999 | Wallick | G08B 21/10 200/61.45 R |
| 2014/0294227 A1 | * | 10/2014 | Fu | B06B 1/04 381/401 |
| 2017/0024983 A1 | * | 1/2017 | Reeves | G08B 21/182 |

* cited by examiner

*Primary Examiner* — Daryl C Pope
(74) *Attorney, Agent, or Firm* — Timothy T. Wang; Ni, Wang & Massand, PLLC

(57) ABSTRACT

An earthquake alarm device, including an alarm lamp and a base. Inside the alarm lamp, there is a power supply module and an earth magnetic field detection module. The earth magnetic field detection module emits a sound and light early warning signal when identifying any earth field abnormality. The vibration sensing module I senses slight vibration and emits a sensing signal I. The vibration sensing module II senses strong vibration and emits a sensing signal II. The control chip II emits sound and light alarm signals after receiving the sensing signal II or the sensing signal I and sound and light early warning signal at the same time. The alarm lamp gives a light alarm after receiving a sound and light early warning signal. The lighting module receives sound and light early warning signals or sound and light alarm signals and provides lighting.

8 Claims, 5 Drawing Sheets

EARTHQUAKE ALARM DEVICE

BACKGROUND

Technical Field

The instant disclosure relates to an earthquake alarm device.

Background

Large-scale earthquake often causes major disasters. To reduce casualties caused by earthquakes, the detection of the occurrence of earthquakes and the escape in the event of earthquakes are quite important. However, according to the products currently available in the market, there is no device for earthquake detection that can be placed at home.

SUMMARY

In one embodiment an earthquake alarm device, having a base, an alarm lamp removably coupled to the base, an earth magnetic field detection module contained within the alarm lamp, wherein the earth magnetic field detection module emits an early warning signal upon identification of an earth magnetic field abnormality and the alarm lamp emits a light alarm responsive to the early warning signal. The alarm further includes a vibration sensing module I contained within the alarm lamp that senses a less than magnitude 4 earthquake vibration and emits a sensing signal I and a vibration sensing module II contained within the alarm lamp that senses a magnitude 4 and larger earthquake vibration and emits a sensing signal II. The alarm also includes a control chip II contained within the alarm lamp that emits an alarm signal responsive to at least one of the sensing signal II and a concurrence of the sensing signal I and the early warning signal. A sound alarm unit contained within the alarm lamp is responsive to at least one of the early warning signal and the alarm signal to audibly alarm. A lighting module contained within the alarm lamp that is responsive to at least one of the early warning signal and the alarm signal to provide lighting and a power supply module contained with the alarm lamp and connected to the lighting module, the earth magnetic field detection module and the control chip II.

DETAILED DESCRIPTION

Figure 1:
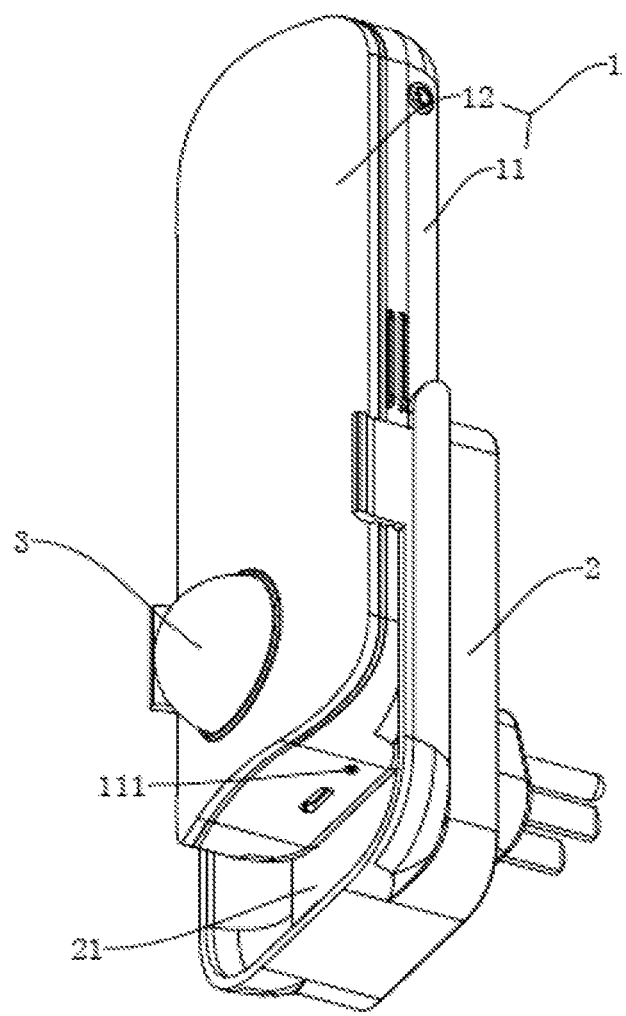
FIG. 1 shows an earthquake alarm device provided by this embodiment.

For the current technical disadvantages, this disclosure provides an earthquake alarm device, which can not only be used as an alarm lamp but can also be used as a lighting device in the event of escape. It is suitable for household use.

To achieve the foregoing purpose, this disclosure provides the following technical plan:

It is an earthquake alarm device, including an alarm lamp and a base. The removable alarm lamp is installed on the base. Inside the alarm lamp, there is a power supply module and an earth magnetic field detection module. The earth magnetic field detection module will emit a sound and light early warning signal when identifying any earth field abnormality. The vibration sensing module I senses slight vibration and emits a sensing signal I. The vibration sensing module II senses strong vibration and emits a sensing signal II. The control chip II emits sound and light alarm signals after receiving the sensing signal II or the sensing signal I and sound and light early warning signal at the same time. The alarm lamp gives a light alarm after receiving a sound and light early warning signal. The sound alarm unit receives sound and light early warning signals or sound and light alarm signals for sound alarms. The lighting module receives sound and light early warning signals or sound and light alarm signals and provide lighting. The power supply module is switched for the power supply of the lighting module, the earth magnetic field detection module and the control chip II.

Optimally, the earth magnetic field detection module includes a control chip III, a compass ball and a hall element. The hall element senses any changes of the compass ball and emits earth magnetic field abnormality signals. The control chip III receives the earth magnetic field abnormality signals and emits sound and light early warning signals.

Optimally, the vibration sensing module I includes a vibration sensor I and an integral circuit I. The vibration sensor I detects vibration, generates a vibration signal and sends the signal to the input end of the integral circuit. The output end of the integral circuit I is connected with the control chip II.

Optimally, the vibration sensing module II includes a vibration sensor II and an integral circuit II. The vibration sensor II detects vibration, generates a vibration signal and sends the signal to the input end of the integral circuit. The output end of the integral circuit II is connected with the control chip II.

Optimally, the lighting module includes a lighting unit and a switch triode I. The switch triode I receives sound and light alarm signals or sound and light alarm signals and controls the lighting provided by the lighting unit.

Optimally, the power supply control module includes a reset switch, a control chip I, a switch circuit I and a switch circuit II. The reset switch is connected with the power supply module on one end, and is connected to the control chip I on the other end. The switch circuit I receives electrical signals from the control chip I and controls the gain and loss of power of the earth magnetic field detection module and the control chip II. The switch circuit II receives electrical signals from the reset switch and controls the gain and loss of power of the lighting unit.

Optimally, the base may be a fixed base or a plug-in base. Both the fixed base and the plug-in base have a connection slot. The module lamp is connected into the connection slot of the plug-in base or fixed base by clamping. The side of the fixed substrate with its back against the connection slot is installed on the wall. And the side of the plug-in base with its back against the connection slot has an installation slot, the installation slot has a removable cover plate, and the cover plate has a plug.

Optimally, the alarm lamp includes a light-transmissive panel and a shell. The shell has an installation slot. The light-transmissive panel covers the installation slot.

Optimally, the alarm lamp has an opening at the bottom. The base has a convex button. When the alarm lamp is inserted into the base, the convex button enters the opening.

The advantages of this device are: The device can not only be used as an earthquake alarm device but can also be used as a lighting device. The earth magnetic field detection module can detect any abnormality of the earth magnetic field, and give light early warning and sound alarm with its alarm lamp and sound alarm unit. With the combination between the vibration sensing module II and the vibration sensing module I and the earth magnetic field detection module, via the control chip II, the alarm lamp and the sound alarm unit can be controlled for giving lighting alarm and sound alarm. In this disclosure, from early warning to alarm, alarms are given to people so that they can be prepared in advance, so that the losses caused by an earthquake can be reduced and the safety of the household users can be enhanced. On the other hand, when an earthquake occurs, people can take down the alarm lamp as a lighting device to facilitate the escape. Via the power supply control module, the power supply to the earthquake magnetic field detection module and the control chip II can be cut off when the device is held in hand as a lighting device, to avoid any false alarm caused by violent shake when the earthquake alarm device is held in hand.

Figure 2:
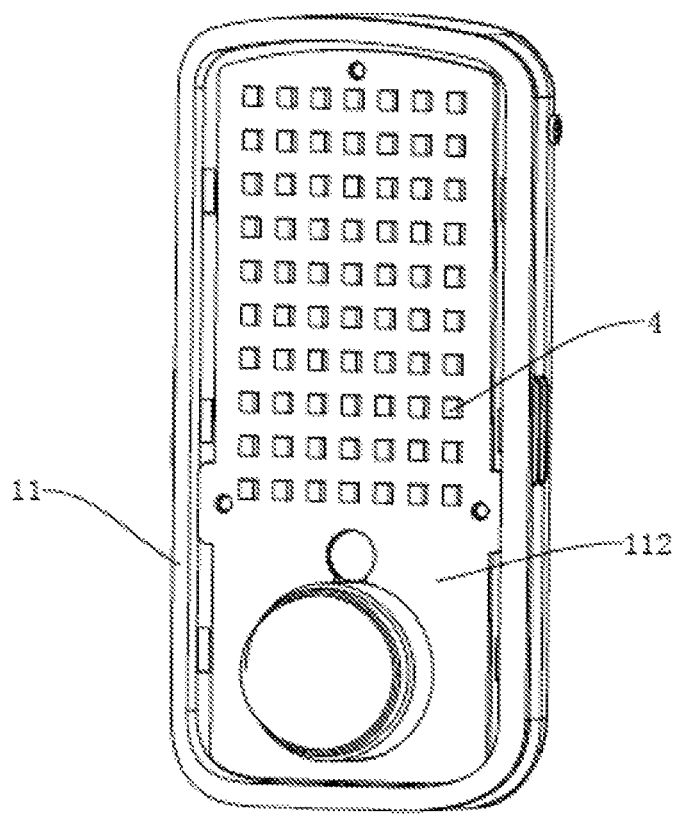
FIG. 2 shows a shell provided by this embodiment.
Figure 3:
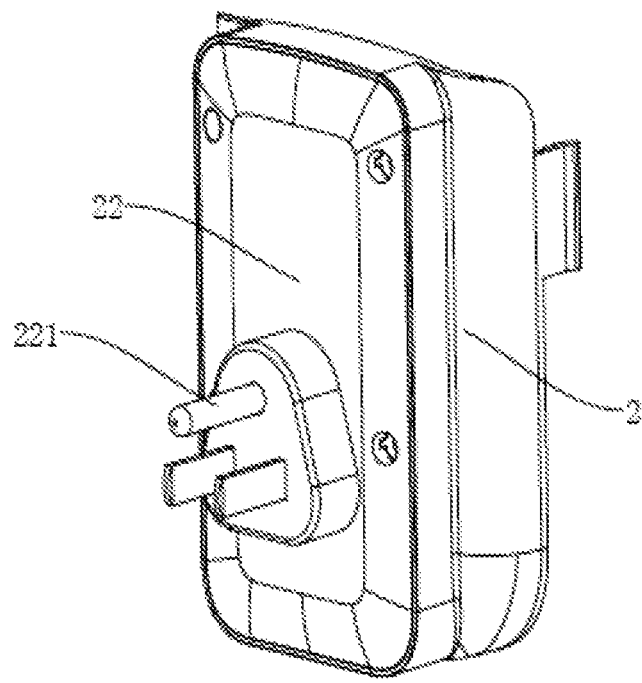
FIG. 3 shows a plug-in base provided by this embodiment.
Figure 4:
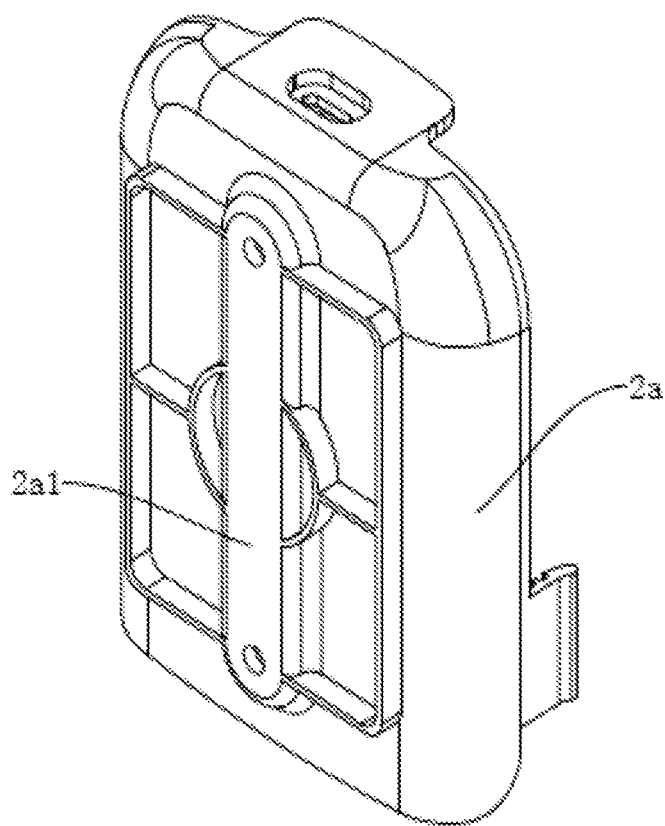
FIG. 4 shows a fixed base provided by this embodiment.
Figure 5:
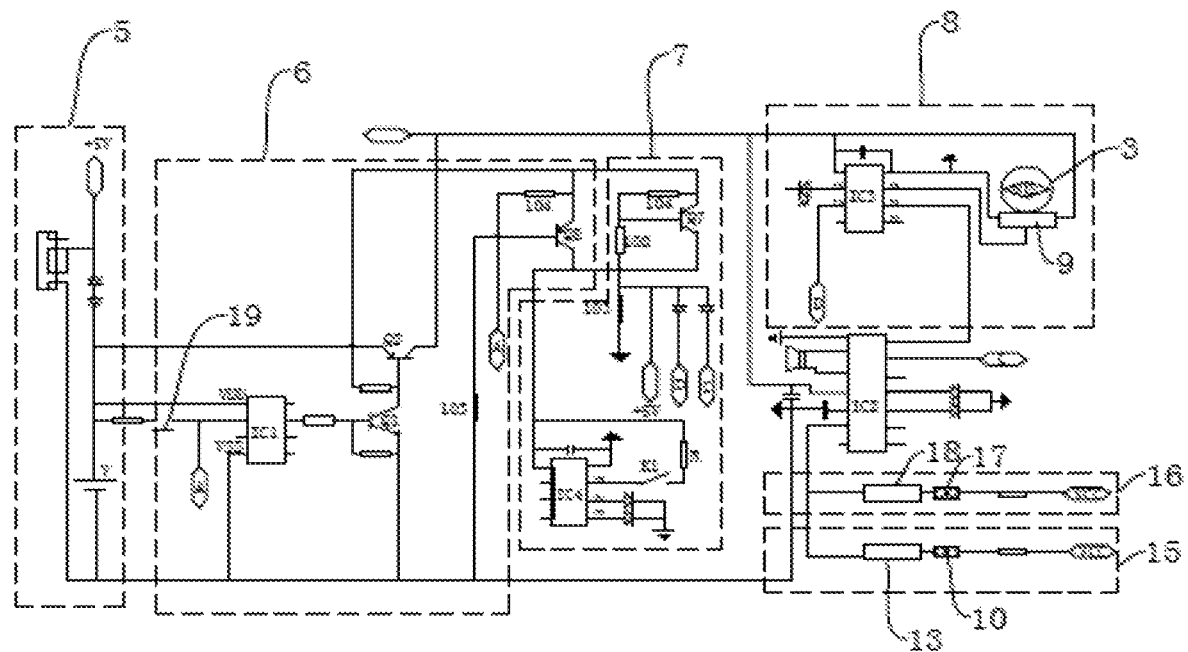
FIG. 5 shows a schematic control circuit diagram of the earthquake alarm device provided by this embodiment.

The earthquake alarm device is further described with FIGS. 1 to 5.

An earthquake alarm device, including an alarm lamp 1 and a base. The alarm lamp 1 can be removed and installed on the base.

The alarm lamp 1 is equipped with a power supply module 5, an earth magnetic field detection module 8, a vibration sensing module I 15, a vibration sensing module II 16, a control chip II IC2, a lighting alarm lamp 4, a sound alarm unit, a lighting module 7 and a power supply control module 6.

The power supply module 5 is for the power supply of the lithium battery and the external power supply module 5.

The earth magnetic field detection module 8 detects the abnormality in the earth magnetic field and emits sound and light early warning signals. The earth magnetic field detection module 8 includes a control chip III IC3, a compass 3 and a hall component 9. The hall element 9 senses any changes of the compass ball 3 and emits earth magnetic field abnormality signals. The control chip III IC3 receives the earth magnetic field abnormality signals and emits sound and light early warning signals. The compass ball 3 remains still, and changes the direction due to certain magnetic change in the event of any earthquake. The hall component 9 detects the change of the magnetic ball and then emits earthquake magnetic field abnormality signals. The structure of such earthquake magnetic field detection module is identical to the that of the magnetic abnormality detection system set forth in the public literature of CN204117315U (publication number). Thus, in this aspect, no additional information will be provided under this application.

The vibration sensing module I 15 senses slight vibration and emits sensing signal I. The vibration sensing module I 15 is comprised of the vibration sensor I 10 and the integral circuit I 13. The vibration sensor I 10 is used for vibration detection. The integral circuit I 13 magnifies the vibration signals detected by the vibration sensor I 10 and generates the sensing signal I. The vibration sensing module II 16 senses strong vibration and emits sensing signal II. The vibration sensing module II 16 is comprised of the vibration sensor II 17 and the integral circuit II 18. The vibration sensor II 17 is used for vibration detection. The integral circuit II 18 magnifies the vibration signals detected by the vibration sensor II 17 and generates the sensing signal II. The integral circuit I 13 and the integral circuit II 18 have resistances and capacitances with different parameters, to magnify the vibration signals detected by the vibration sensor I 10 and the vibration sensor II 17 by different times, to facilitate the identification by the control chip II IC2. Meanwhile, it shall be specified that: the slight vibration refers to vibration of an earthquake of less than magnitude 4, and the strong vibration refers to vibration of an earthquake of at least magnitude 4.

The control chip II IC2 emits sound and light alarm signals after receiving the sensing signal II or receiving the sensing signal I and the sound and light early warning signal at the same time.

The lighting alarm lamp 4 emits lighting early warnings after receiving sound and light early warning signals and emits lighting alarms after receiving sound and light alarm signals. The lighting alarm lamp 4 includes multiple LED lamps. The multiple LED lamps are divided into two groups, including one group of white lamps and one group of red lamps. In the event of lighting early warnings, only the red lamps will be on, and in the event of lighting alarms, the white lamps and the red lamps will flash alternately.

The sound alarm unit is connected to the control chip II IC2 and the control chip III IC3, receiving sound and light early warning signals or sound and light alarm signals and giving sound alarms.

The lighting module 7 receives sound and light early warning signals or sound and light alarm signals and emits light. The lighting module 7 includes a lighting unit and a switch triode I Q7. The switch triode I Q7 receives sound and light early warning signals or sound and light alarm signals and controls the lighting of the lighting unit. The base electrode of the switch triode I Q7 is connected with the control chip II IC2 and the control chip III IC3, and is grounded at the same time. The collector is connected with the positive electrode of the power supply module 5, and the emitter is connected with the lighting unit. The lighting unit includes the control chip IV IC4 and multiple LED lamps. The multiple LED lamps are connected with the control chip IV IC4.

The power supply control module 6 switches the power supply from the power supply module 5 for the lighting module 7 as well as the earth magnetic detection module 8 and the control chip II IC2. The power supply control module 6 includes the reset switch 19, the control chip I IC1, the switch circuit I and the switch circuit II. The reset switch is connected with the positive electrode of the power supply module 5 on one end, and connected to the control chip I IC1 on the other end. The switch circuit I receives electrical signals from the control chip I controls the gain and loss of power of the earth magnetic field detection module 8 and the control chip II IC2.

The switch circuit I includes a switch triode II Q1 and a switch triode III Q2. The base electrode of the switch triode II Q1 is connected with the control chip I IC1; the collector is connected with the positive electrode of the power supply module 5; the emitter is grounded. The base electrode of the switch triode III Q2 is connected with the collector of the switch triode II Q1; the collector is connected with the positive electrode of the power supply module 5; the emitter is connected with the control chip II IC2 and the control chip III IC3.

The switch circuit II receives electrical signals from the reset switch 19 to control the gain and loss of power of the lighting unit. The switch circuit II is the switch triode IV Q8.

The base electrode of the switch triode IV Q8 is grounded while being connected with the reset switch 19; the collector is connected to the positive electrode of the power supply module 5; the emitter is connected with the control chip IV IC4.

Furthermore, the base may be a fixed base 2a or a plug-in base 2. Both the fixed base 2a and the plug-in base 2 have a connection slot 21. The module lamp 1 is connected into the connection slot 21 of the plug-in base or fixed base 2a by clamping. The side of the fixed base with its back against the connection slot 21 is the side for wall installation 2a1. And the side of the plug-in base 2 with its back against the connection slot 21 has an installation slot, the installation slot has a removable cover plate 22, and the cover plate 22 has a plug 221. The alarm lamp 1 can be installed on the fixed base 2a, and then mounted on the wall via the fixed base 2a, for charging with a charging cable. Another method is to install the alarm lamp 1 on the plug-in base 2 and connect the plug-in base 2 to the socket of the wall for charging. Meanwhile, to mount the alarm lamp 1 on the wall via the fixed base 2a or the plug-in base 2 saves some space and prevents the device from being touched by accident under normal conditions. On the other hand, the alarm lamp 1 can be taken down from the connection slot 21 as a lighting lamp. The cover plate can be removed from the plug-in base 2, so that the cover plate can be replaced; to be specific, a cover plate 22 that is different in specifications from the plug 221, so that this device can be used in different countries.

Furthermore, the alarm lamp 1 includes a light transmissive panel 12 and a shell 11. The shell 11 has an installation slot 112. The light transmissive panel 12 covers the installation slot. The lighting alarm lamp and the lighting module 7 are both installed in such installation slot. Thus, the light emitted from the lighting alarm lamp and the lighting module 7 can go through the transparent panel for lighting or alarms.

Furthermore, the alarm lamp 1 has an opening 111 at the bottom. The reset switch in the power supply control module 6 is inside the opening 111. There is a convex button on the base. When the alarm lamp 1 is inserted into the base, the convex button enters the opening 111 and closes the reset switch. Then the control chip II IC2 and the control chip III IC3 gain power, and implement earthquake detection with the alarm lamp 1 in place. When the alarm lamp 1 is taken down from the base, the reset switch is off, and the control chip IV IC4 gains power, to implement the lighting function when the alarm lamp is not in place.

To sum up, the working principle of this device is:

1. When the alarm lamp 1 is installed on the base:

The reset switch is off, the switch triode II Q1 breaks over, the voltage of the base electrode of the switch triode III Q2 is brought down, the switch triode III Q2 breaks over, and the power supply module 5 supplies power to the control chip II IC2 and the earth magnetic field detection module 8; the reset switch is off, the base electrode of the switch triode IV Q8 is at a high potential, the switch triode I Q8 is off, and the power supply module 5 stops supplying power to the lighting unit. When an earthquake comes, the ball pointer waves; the hall component 9 detects the waving of the ball pointer and sends a corresponding signal to the control chip III IC3; the control chip III IC3 emits a sound and light early warning signal to the lighting alarm lamp, the sound alarm unit and the base electrode of the switch triode I Q7; the lighting alarm lamp gives red light as an early warning and the sound alarm unit gives a sound early warning, the switch triode I Q7 breaks over, the lighting unit emits light when gaining power, and red light goes through the whole transparent panel as an early warning.

The control chip II IC2 receives sound and light early warning signals from the control chip III IC3. Meanwhile, after receiving the vibration sensing signal i, the control chip II IC2 emits a sound and light alarm signal to the lighting alarm lamp, the sound alarm unit and the base electrode of the switch triode I Q7. Then the white-light LED lamps and red-light LED lamps flash alternately. In the meantime, the switch triode I Q7 breaks over, the lighting unit emits light when gaining power, red light and white light flicker alternately on the transparent panel and the sound alarm unit gives a sound alarm, to give an alarm with the alarm lamp 1.

When the control chip II IC3 receives the sensing signal II, it will emit a sound and light alarm signal and control the alternate flicker of red light and white light and implements the alarm with the sound alarm unit.

2. When the alarm lamp 1 is not on the base:

When the reset switch is off, the switch triode IV Q8 is at a low potential, the switch triode IV Q8 breaks over, the power supply module 5 supplies power to the lighting unit, and the lighting unit provides light. Then the user can take the alarm lamp 1 for lighting in the course of escape.

The foregoing embodiment methods are only the optimal embodiment methods for this invention, and the scope of protection of this invention will not be limited to the foregoing embodiment methods. Any technical programs with the ideas in this disclosure will fall within the scope of this invention. What needs to be specified that for common technicians in this disclosure as filed, without being divorced from the ideas of this invention, a number of improvements and transformations that may be made will fall within the scope of protection of this invention.

What is claimed is:

1. An earthquake alarm device, comprising:
a base;
an alarm lamp removably coupled to the base;
an earth magnetic field detection module contained within the alarm lamp, wherein the earth magnetic field detection module emits an early warning signal upon identification of an earth magnetic field abnormality and the alarm lamp emits a light alarm responsive to the early warning signal;
a vibration sensing module I contained within the alarm lamp, that senses a less than magnitude 4 earthquake vibration and emits a sensing signal I;
a vibration sensing module II contained within the alarm lamp, that senses a magnitude 4 and larger earthquake vibration and emits a sensing signal II;
a control chip II contained within the alarm lamp that emits an alarm signal responsive to at least one of the sensing signal II and a concurrence of the sensing signal I and the early warning signal;
a sound alarm unit contained within the alarm lamp responsive to at least one of the early warning signal and the alarm signal and that audibly alarms;
a lighting module contained within the alarm lamp responsive to at least one of the early warning signal and the alarm signal to provide lighting; and
a power supply module contained within the alarm lamp and connected to the lighting module, the earth magnetic field detection module and the control chip II;
wherein said earth magnetic field detection module further comprising:

a compass ball contained within the alarm lamp;

a hall element connected to the compass ball, responsive to changes in the compass ball and emits an earth magnetic field abnormality signal; and a control chip III, connected to the hall element, responsive to the earth magnetic field abnormality signal and emits the early warning signal.

2. The earthquake alarm device of claim 1, the vibration sensing module I further comprising:

a vibration sensor I contained within the alarm lamp that detects vibration and generates a vibration signal I; and an integral circuit I connected to the vibration sensor, responsive to the vibration signal I and outputs a vibration signal output I to the control chip II.

3. The earthquake alarm device of claim 1, the vibration sensing module II further comprising:

a vibration sensor II contained within the alarm lamp that detects vibration and generates a vibration signal II; and an integral circuit II connected to the vibration sensor II, responsive to the vibration signal II and outputs a vibration signal output II to the control chip II.

4. The earthquake alarm device of claim 1, further comprising:

a lighting unit coupled to the lighting module; and a switch triode I connected to the lighting unit, responsive to the alarm signal and controls lighting provided by the lighting unit.

5. The earthquake alarm device of claim 1, further comprising:

a clamp connectable to one of a fixed base and a plug-in base and the alarm lamp via the base having a connection slot, the base having an installation slot that is connectable to a removable cover plate having a plug.

6. The earthquake alarm device of claim 1, the alarm lamp further comprising:

a shell having an installation slot; and a light-transmissive panel that covers the installation slot.

7. The earthquake alarm device of claim 1 further comprising:

a convex button connected to the base, wherein the convex button is complementary to the alarm lamp having a bottom opening.

8. An earthquake alarm device, comprising:

a base;

an alarm lamp removably coupled to the base;

an earth magnetic field detection module contained within the alarm lamp, wherein the earth magnetic field detection module emits an early warning signal upon identification of an earth magnetic field abnormality and the alarm lamp emits a light alarm responsive to the early warning signal;

a vibration sensing module I contained within the alarm lamp, that senses a less than magnitude 4 earthquake vibration and emits a sensing signal I;

a vibration sensing module II contained within the alarm lamp, that senses a magnitude 4 and larger earthquake vibration and emits a sensing signal II;

a control chip II contained within the alarm lamp that emits an alarm signal responsive to at least one of the sensing signal II and a concurrence of the sensing signal I and the early warning signal;

a sound alarm unit contained within the alarm lamp responsive to at least one of the early warning signal and the alarm signal and that audibly alarms;

a lighting module contained within the alarm lamp responsive to at least one of the early warning signal and the alarm signal to provide lighting; and a power supply module contained within the alarm lamp and connected to the lighting module, the earth magnetic field detection module and the control chip II;

a lighting unit coupled to the lighting module; and a switch triode I connected to the lighting unit, responsive to the alarm signal and controls lighting provided by the lighting unit;

wherein, the power supply module further comprising:

a control chip I contained within the alarm lamp;

a reset switch connected to the power supply module and the control chip I;

a switch circuit I connected to the control chip I, responsive to electrical signals from the control chip I and controls power to the earth magnetic field detection module and to the control chip II; and a switch circuit II connected to the reset switch, responsive to electrical signals from the reset switch and controls the power to the lighting unit.

* * * * *